United States Patent [19]

Benda

[11] Patent Number: 4,845,469
[45] Date of Patent: Jul. 4, 1989

[54] DEVICE FOR ELECTRICALLY MONITORING OIL LEVEL, PARTICULARLY IN AUTOMOBILE INTERNAL COMBUSTION ENGINES

[75] Inventor: Franz Benda, Frankfurt am Main, Fed. Rep. of Germany

[73] Assignee: VDO Adolf Schindling AG, Frankfurt am Main, Fed. Rep. of Germany

[21] Appl. No.: 871,030

[22] Filed: Jun. 5, 1986

[30] Foreign Application Priority Data

Jun. 5, 1985 [DE] Fed. Rep. of Germany ....... 3520126

[51] Int. Cl.$^4$ ............................................. B60Q 1/00
[52] U.S. Cl. ................. 340/450.3; 340/622; 73/295
[58] Field of Search ................ 340/59, 618, 620, 622; 73/304 R, 290 R, 295

[56] References Cited

U.S. PATENT DOCUMENTS

| | | | |
|---|---|---|---|
| 3,863,210 | 1/1975 | Roland et al. | 340/59 |
| 3,939,470 | 2/1976 | Arai et al. | 340/59 |
| 4,116,045 | 9/1978 | Potter | 340/622 |
| 4,476,714 | 10/1984 | Barry et al. | 340/59 |

Primary Examiner—Joseph A. Orsino
Assistant Examiner—Jeffery A. Hofsass
Attorney, Agent, or Firm—Martin A. Farber

[57] ABSTRACT

In a device for electrically monitoring oil level, particularly in automobile internal combustion engines, a first temperature-dependent resistance element (1) is housed within a hollow space in an oil measurement rod and positioned at the height of a filling level. The device signals a dropping of the oil level below the filling level. A first resistance element is connected to an evaluation circuit having a source of current (17-23, 26, 27). A second temperature-dependent resistance element (16) is located in the oil measurement rod at a lower point than the first temperature-dependent resistance element (1). In order to be able to monitor the oil level over a large temperature range, the second temperature-dependent resistance element (16) can be switched to the evaluation circuit (emitter resistor 19) for correction of a switching threshold of the evaluation circuit as a function of temperature.

6 Claims, 2 Drawing Sheets

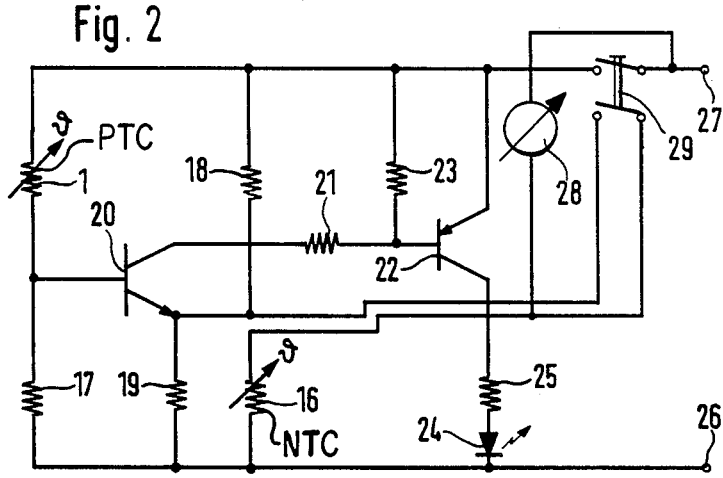
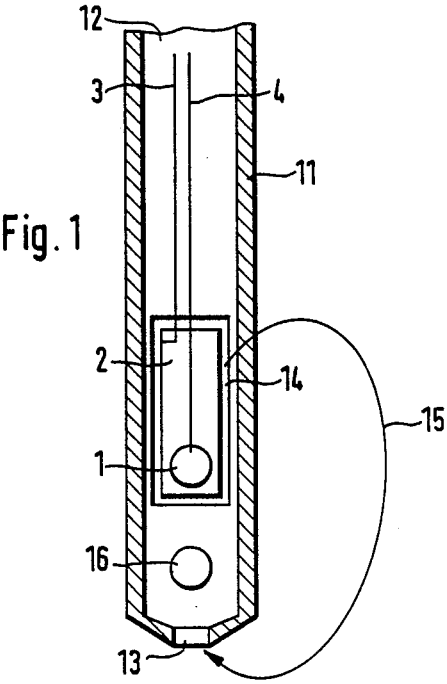

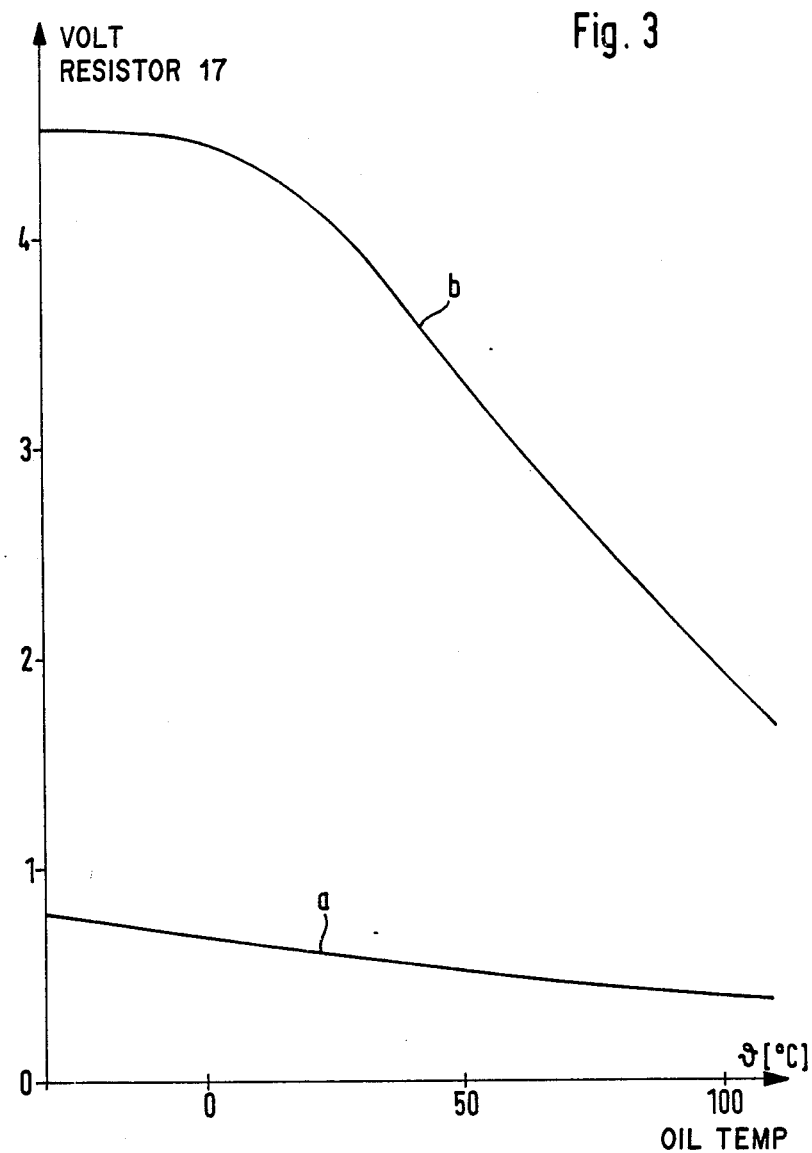

DEVICE FOR ELECTRICALLY MONITORING OIL LEVEL, PARTICULARLY IN AUTOMOBILE INTERNAL COMBUSTION ENGINES

FIELD AND BACKGROUND OF THE INVENTION

The present invention relates to a device for electrically monitoring oil level, particularly in automobile internal combustion engines, which device is housed within a hollow space in an oil measurement rod and is located at the height of a filling level, the dropping of the oil level below the filling level being signaled and for which purpose is connected to an evaluation circuit having a source of current, the evaluation circuit switching at at least one switching threshold, there being a second temperature-dependent resistance element which is positioned in the oil measurement rod at a lower place than the first temperature-dependent resistance element, as part of an oil-temperature display device.

In such known devices, a resistor having a positive temperature coefficient (PTC) which can be encapsuled in bead form in glass, is used, for instance, as a temperature-dependent resistance element. The temperature-dependent resistance element can be connected via lead wires to an evaluation-circuit with a source of current, by which circuit the temperature prevailing at the resistance element can be converted into an electrical signal. In this connection, use is made of the fact that the resistance element, depending on how far it is immersed in a medium, typically oil of better thermal conductivity than air, gives off to its environment a greater or lesser amount of the heat which is produced by a current flowing through the resistance element. If for instance, the resistance element is immersed in oil, a substantial amount of heat is given off and the temperature of the resistance element is correspondingly low. To this there corresponds a relatively low resistance and small voltage drop over the temperature-dependent resistance element or a large voltage drop over an ohmic resistance element connected in series therewith. On the other hand, if the temperature-dependent resistance element is in air, then only a small amount of heat is given off and the resistance element is heated to a comparatively high temperature.

As a result of the fact that the resistance of the temperature-dependent resistance element is then higher, there is a relatively large voltage drop over it and there is a corresponding voltage drop which can be evaluated over the series-connected ohmic resistor. The evaluation-circuit is provided for this purpose and has a bridge circuit in which the temperature-dependent resistor is connected in one branch of the bridge, and control connections for an amplifier, in particular a transistor which switches at at least one switching threshold, are connected in the neutral branch thereof. The amplifier switches at a switching threshold in particular, when the oil level drops below a predetermined amount. With a somewhat higher switching threshold, switching can again take place when the oil level rises above the level at which the first switching took place. Thus a drop below a predetermined amount of oil in an internal combustion engine can be signaled, for which purpose a light-emitting diode can be used.

However, these known devices for the electrical monitoring of oil level operate only within a relatively narrow temperature range unless special compensatory measures are taken. This is due to the fact that, with an increase in the surrounding temperature, for instance the temperature of the oil, the voltage drop over the ohmic resistor connected in series with the temperature-dependent resistor becomes constantly smaller. Also the difference in the voltage drops at the series-connected ohmic resistor between the operating cases of immersed and non-immersed temperature-dependent resistor decreases.

In order to extend the utility of the known devices for the electric monitoring of oil level to a larger temperature range it is also known to adapt the response level of the amplifier of the evaluation circuit as a function of temperature. For this temperature compensation a further temperature-dependent resistor can be so located that it is surrounded by the fluid to be monitored, namely the oil. However, the locating of the further temperature-dependent resistor within the limited hollow space of a hollow oil measurement rod affords difficulties, particularly if the oil measurement rod already contains a second resistance element which is part of a device for measuring the temperature of the oil.

SUMMARY OF THE INVENTION

The object of the present invention is to broaden the reliably useful operating range of a device for the electric monitoring of oil level of the aforementioned type to deal with larger variations in the surrounding temperature, without the necessity of providing another temperature-dependent resistor within the oil measurement rod.

This object is achieved by developing the device for the electrical monitoring of the oil level, the second temperature-dependent resistance element (16) can be switched to the evaluation circuit (emitter resistor 19) for correcting the switching threshold as a function of the temperature.

In accordance with the invention, in order to adjust the switching threshold of the oil-level monitoring device, use is made of the second temperature-dependent resistance element which is provided for indicating the temperature of the oil. It is therefore no longer necessary to provide another temperature-dependent resistance element within the relatively small hollow space of an oil measurement rod merely to alter the switching threshold.

The device of the invention is therefore characterized by an extended temperature range within which a drop of the oil level below a predetermined position is reliably indicated. The second temperature-dependent resistor is thus imparted a twofold function—to display the oil temperature and to alter the switching threshold as a function of the oil temperature.

When the device for the electric monitoring of the oil level is developed with a bridge circuit in whose neutral branch the control connections of a transistor are present, in particular the base-emitter path, and wherein one bridge arm includes the first temperature-dependent resistor, adjustment of the switching threshold of the transistor can be suitably effected by connecting the second temperature-dependent resistor to one of the bridge branches other than the branch containing the first temperature-dependent resistor.

The second temperature-dependent resistance element which is provided for the measurement of the oil temperature may consist, particularly advantageously, of an NTC (negative temperature coefficient) resistor which is connected in parallel to the emitter-resistor of an npn-transistor as a switch transistor for control of the oil level in a wide temperature range.

The switching of the second temperature-dependent resistor is advantageously effected by a push-button switch by which the second temperature-dependent resistor can be switched to one of the bridge branches or to the emitter resistor of the npn-transistor or to be connected to the electric temperature display instrument. The switch is advisedly developed as a push-button switch which can be actuated briefly as desired, prior to the starting of the internal combustion engine.

The use in accordance with the invention of the second temperature-dependent resistance element, which is provided for the display of the oil temperature, is particularly suitable in combination with a first temperature-dependent resistant element of relatively large surface adapted to be arranged within the hollow space of the oil measurement rod. The large-surface temperature-dependent resistance element is advantageously positioned in good heat-conducting fashion on a small plate of high thermal conductivity which fits in the hollow space of the oil measurement rod. In this way a large measurement effect is obtained since the heat given off by the first temperature-dependent resistance element when immersed in the oil is large. The space available is the interior of the oil measurement rod for the arrangement of other electrical components is however reduced by this location of the first temperature-dependent resistance element.

BRIEF DESCRIPTION OF THE DRAWINGS

With the above and other objects and advantages in view, the present invention will become more clearly understood in connection with the detailed description of a preferred embodiment, when considered with the accompanying drawings, of which:

FIG. 1 shows the arrangment of first and second temperature-dependent resistance elements at the lower end of an oil measurement rod which is shown enlarged in a longitudinal section;

FIG. 2 shows a circuit including the first and the second temperature-dependent resistance elements; and FIG. 3 shows measurement signals which are produced by the first temperature-dependent resistance element for the monitoring of the oil level as a function of the surrounding temperature.

DETAILED DESCRIPTION OF THE PREFERRED EMBODIMENT

It can be noted from FIG. 1 that a lower end of an oil temperature measurement rod 11 is formed with a hollow space 12 which communicates with a lower opening 13. Furthermore, the oil measurement rod 11 bears a lateral window opening 14. Oil circulation can take place through the lower opening 13 and the window 14, as indicated by the line 15.

Within the hollow space of the oil measurement rod 11, namely within the region of the window 14, there is disposed a first resistance element 1 having a small plate (support) 2 of bronze or ceramic which is provided for the monitoring of the oil level. Lead wires 3,4 extend out of the oil measurement rod 11 to an evaluation circuit having a source of current as shown in FIG. 2.

In the lowermost part of the hollow space of the oil measurement rod 11, a second temperature-dependent resistance element 16 is present which has a negative temperature coefficient (NTC). The resistance element 16 is employed for displaying oil temperature and is used in addition, for controlling the switching threshold of the evaluation circuit of FIG. 2. Electrical connections between the second resistance element 16 are not shown in FIG. 1.

In FIG. 2, the evaluation circuit comprises a bridge circuit, wherein bridge branches comprise the first temperature-dependent resistance element 1, a series resistor 17, a resistor 18, and an emitter resistor 19. In a neutral branch of the bridge circuit, there is a base-emitter path of an npn-transistor 20. The emitter of the transistor 20 is connected to a junction point of the resistors 18 and 19. From the collector of the transistor 20, which forms a first switching amplifier stage with a threshold value, a line passes via a coupling resistor 21 to a pnp-transistor 22 of a second amplifier stage. A base series-resistor of the pnp-transistor 22 is designated 23. Within a collector branch of the pnp-transistor 22, a light-emitting diode 24 and a series resistor 25 are connected. The light-emitting diode 24 serves to indicate that the oil level has dropped below a predetermined level which is determined by the position of the first temperature-dependent resistance element 1 in the oil measurement rod 11 and, thus, in the oil of the internal combustion engine.

The circuit described can be connected to a source of current (not shown) at terminals 26 and 27.

The circuit of FIG. 2 furthermore comprises a circuit part for a null temperature display which consists of the second temperature-dependent resistance element 16 having a negative temperature coefficient (NTC), and a display instrument 28 which is normally located in the region of the dashboard of an automotive vehicle.

The circuit includes a two-pole push-button switch 29. When the switch 29 is in its normal position, as shown in FIG. 2, a circuit of the source of current at the terminals 26, 27 is closed via the display instrument 28 and the second temperature-dependent resistance element 16. Since the second temperature-dependent resistance element 16 dips continuously into the oil, the temperature of the oil is continuously indicated.

By depressing the push-button switch 29, the monitoring of the oil level is actuated as desired, in particular before the starting of the internal combustion engine.

For this purpose, the bridge circuit with the transistor 20 and the transistor 22 are connected to the source of current at the terminals 26 and 27. Furthermore, the second temperature-dependent resistor 16 is connected in parallel to the emitter resistor 19. As a result of the temperature dependence of the first temperature-dependent resistance element 1, a positive temperature coefficient resistor (PCT-resistor) a voltage drop is developed over the series resistor 17, the basic course of said drop being shown in FIG. 3.

In FIG. 3, curve a shows the course of the voltage drop over the series resistor 17 when the first temperature-dependent resistance element 1 is in the immersed state and curve b shows the course of the voltage drop over the series resistor 17 when the first temperature-dependent resistance element 1 is no longer in the oil. Both curves show the course of the voltage drop as a function of the first temperature-dependent resistance element 1.

When the plate 2 bearing the first resistance element 1 is immersed in oil, the heat produced in the resistance element 1 is given off substantially via the surface of the plate 2 to the oil, and the temperature of the resistance element 1 is kept relatively low. On the other hand, if the resistance element 1 together with the plate 2 is free in the air within the hollow space 12, then only a small amount of heat is given off by the resistance element 1 and the plate 2 to the surroundings and the resistance element 1 is heated to a relatively high temperature by the current flowing through the lead wires 3,4.

With the evaluation circuit, which is adapted to be connected to the lead wires 3,4, it is possible in the case of low oil temperatures $\sigma$ to note great difference in voltage drop over the resistance element 1, depending on whether the resistance element 1 is immersed or not: see curves a and b in FIG. 3, left-hand part.

On the other hand, if the oil temperature is high, then the voltage drops over the first temperature-dependent resistance element 1, and thus in analogous but converse manner over the series resistor 17, approach each other; see curves a and b in FIG. 3, right-hand part.

The resistors 18 and 19—the resistor 19 serves as the emitter resistor of the npn-transistor 20—are so dimensioned that the transistor 20 is in a first (conductive) switch condition when the first temperature-dependent resistance element 1 is immersed and enters into a second (blocked) switch condition when the first temperature-dependent resistance element 1 is not immersed. The difference in the voltages corresponding to curves a and b is assured in reliable fashion only within a small range of surrounding temperatures $\sigma$.

In order to adapt the switching threshold of the transistor 20 corresponding to the surrounding temperature $\sigma$, the second temperature-dependent resistance element 16, is connected in parallel in the depressed switch position of the push-button switch 29 to the emitter resistor 19 when the oil level is to be checked. As a result of the negative temperature coefficient of the second temperature-dependent resistance element 16, the potential at the emitter is relatively high when the temperature $\sigma$ is small and the potential at the emitter is lowered, to a greater or lesser extent, upon an increase in the temperature. Thus the switching threshold is adapted to the temperature $\sigma$ in such a manner that the transistor 20 dependably assumes its first or its second switch position depending upon whether the first temperature-dependent resistance element 1 is immersed or not.

When the transistor 20 conducts, the following npn-transistor 22 also comes into its conductive state and the light-emitting diode 24 lights up. In the reverse case, if the transistor 22 does not conduct upon actuation of the push-button switch 29 because the transistor 20 is blocked, the driver realizes that the oil level is too low, regardless of the condition of heating of the oil.

I claim:

1. A device for electrically monitoring oil level, particularly in automobile internal combustion engines, comprising:
   an oil measurement rod having a hollow space;
   a display of oil temperature;
   a first temperature-dependent resistance element housed in said hollow space;
   an elevation circuit including an oil-level indicator and first switching means for activating said indicator, said first switching means having an oil-level sensitive switching thresholds; and
   a second temperature-dependent resistance element housed in said measurement rod at a lower place than a location of said first resistance element; and wherein
   said first resistance element is positioned in said oil measurement rod at the height of a filling level, a dropping of the level of oil below the filling level activating said evaluation circuit to energize said indicator, said evaluation circuit being connected to said first resistance element and being responsive to current of a source of current applying current to said first resistance element, said evaluation circuit switching at at least one switching threshold to energize said indicator; and wherein
   said evaluation circuit further comprises second switching means coupled to said second resistance element for switching said second resistance element to the evaluation circuit for adjusting the switching threshold as a function of the temperature, said first switching means being operative to direct current from said current source serially through said indicator and said second resistance element concurrently with a connection of said second resistance element to said evaluation circuit by said second switching means, said second switching means being operative to direct current from said current source serially through said display and said second resistance element upon a disconnection of said second resistance element from said evaluation circuit.

2. The device according to claim 1, wherein said evaluation circuit further comprises
   a bridge circuit having a neutral branch, said first switching means including a transistor having a control terminal within said neutral branch, said transistor emitting a signal which signals that the filling level has dropped; and wherein
   said bridge further comprises a first arm and a second arm, said first bridge arm including said first resistance element, said second resistance element being switchable by said second switching means to said second bridge arm.

3. The device according to claim 1, wherein
   said first resistance element is a PTC-resistor, and said second resistance element is an NTC-resistor; said evaluation circuit further comprising:
   a bridge circuit having a neutral branch; and wherein
   said first switching means includes an npn-transistor with a base-emitter path located in said neutral branch of the bridge circuit, the bridge circuit further comprising an emitter resistor coupled to the emitter of said transistor; and
   wherein said second resistance element is switched by said second switching means to be in parallel to the emitter resistor.

4. A device for electrically monitoring oil level, particularly in automobile internal combustion engines, comprising:
   an oil measurement rod having a hollow space;
   a first temperature-dependent resistance element housed in said hollow space;
   an evaluation circuit including an oil-level indicator and first switching means for activating said indicator, said first switching means having an oil-level sensitive switching threshold; and
   a second temperature-dependent resistance element housed in said measurement rod at a lower place than a location of said first resistance element; and wherein
   said first resistance element is positioned in said oil measurement rod at the height of a filling level, a dropping of the level of oil below the filling level being signaled by said evaluation circuit, said evaluation circuit being connected to said first resistance element and having a source of current, said evaluation circuit switching at at least one switching threshold; and wherein said evaluation circuit further comprises second switching means coupled to said second resistance element for switching said second resistance element to the evaluation circuit and adjusting the switching threshold as a function of the temperature; the evaluation circuit further comprising a bridge circuit having a neutral branch, said first switching means including a transistor having a control terminal within said neutral branch, said transistor emitting a signal which signals that the filling level has dropped; and wherein said bridge further comprises a first arm and a second arm, said first bridge arm including said first resistance element, said second resistance element being switchable by said second switching means to said second bridge arm; the device further comprising means coupled to said second resistance element and to said second switching means for displaying temperature; and wherein said second switching means is a push-button switch by which said second resistance element is switched, alternatively, for connection and disconnection to the second arm of said bridge for indicating the oil level and for displaying temperature.

5. A device for electrically monitoring oil level, particularly in automobile internal combustion engines, comprising:

an oil measurement rod having a hollow space;

a first temperature-dependent resistance element housed in said hollow space;

an evaluation circuit including an oil-level indicator and first switching means for activating said indicator, said first switching means having an oil-level sensitive switching threshold; and a second temperature-dependent resistance element housed in said measurement rod at a lower place than a location of said first resistance element; and wherein said first resistance element is positioned in said oil measurement rod at the height of a filling level, a dropping of the level of oil below the filling level being signaled by said evaluation circuit, said evaluation circuit being connected to said first resistance element and having a source of current, said evaluation circuit switching at at least one switching threshold; and wherein said evaluation circuit further comprises second switching means coupled to said second resistance element for switching said second resistance element to the evaluation circuit and adjusting the switching threshold as a function of the temperature; and wherein said first resistance element is a PTC-resistor, and said second resistance element is an NTC-resistor; said evaluation circuit further comprising:

a bridge circuit having a neutral branch;

said first switching means includes an npn-transistor with a base-emitter path located in said neutral branch of the bridge circuit, the bridge circuit further comprising an emitter resistor coupled to the emitter of said transistor; and wherein said second resistance element is switched by said second switching means to be in parallel to the emitter resistor; the device further comprising means coupled to said second resistance element and to said second switching means for displaying temperature; and wherein said second switching means is a push-button switch by which said second resistance element is switched, alternatively, to connect and disconnect the second resistance element from the emitter resistor for indicating the oil level and for displaying temperature.

6. A device for electrically monitoring oil level, particularly in automobile internal combustion engines, comprising:

an oil measurement rod having a hollow space;

a first temperature-dependent resistance element housed in said hollow space;

an evaluation circuit including an oil-level indicator and first switching means for activating said indicator, said first switching means having an oil-level sensitive switching threshold;

a second temperature-dependent resistance element housed in said measurement rod at a lower place than a location of said first resistance element;

said evaluation circuit further comprising a bridge circuit having a neutral branch, said first switching means including a transistor having a control terminal within said neutral branch, a first arm and a second arm connected by said transistor, said transistor emitting a signal which signals that the filling level has dropped, said first and said second arms including respectively said first and said second resistance elements; and wherein said evaluation circuit further comprises second switching means coupled to said second resistance element for switching said second resistance element to the evaluation circuit for adjusting the switching threshold as a function of the temperature of the oil;

said first resistance element is a PTC-resistor, and said second resistance element is an NTC-resistor; and said first resistance element is positioned in said oil measurement rod at the height of a filling level, a dropping of the level of oil below the filling level being signaled by said evaluation circuit, said evaluation circuit being responsive to a source of current applying current through said first and said second resistance elements, said evaluation circuit switching at at least one switching threshold.

* * * * *